United States Patent
Todori et al.

(10) Patent No.: US 7,772,551 B2
(45) Date of Patent: Aug. 10, 2010

(54) REFRACTIVE INDEX VARIABLE ELEMENT AND METHOD OF VARYING REFRACTIVE INDEX

(75) Inventors: Kenji Todori, Yokohama (JP); Reiko Yoshimura, Kawasaki (JP); Fumihiko Aiga, Yokohama (JP); Tsukasa Tada, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 586 days.

(21) Appl. No.: 11/229,304

(22) Filed: Sep. 19, 2005

(65) Prior Publication Data

US 2006/0067602 A1    Mar. 30, 2006

(30) Foreign Application Priority Data

Sep. 29, 2004  (JP) .............................. 2004-285001

(51) Int. Cl.
*H01J 40/00* (2006.01)
(52) U.S. Cl. ................................. 250/305; 385/8; 385/2
(58) Field of Classification Search .................. 250/305
See application file for complete search history.

(56) References Cited

U.S. PATENT DOCUMENTS

| | | | | |
|---|---|---|---|---|
| 5,747,180 A | * | 5/1998 | Miller et al. | 428/601 |
| 6,728,281 B1 | * | 4/2004 | Santori et al. | 372/45.01 |
| 6,859,477 B2 | * | 2/2005 | Deppe et al. | 372/45.01 |
| 7,200,318 B2 | * | 4/2007 | Banin et al. | 385/147 |
| 2004/0105476 A1 | * | 6/2004 | Wasserbauer | 372/50 |
| 2004/0131097 A1 | * | 7/2004 | Deppe et al. | 372/45 |
| 2005/0002635 A1 | * | 1/2005 | Banin et al. | 385/147 |

FOREIGN PATENT DOCUMENTS

| | | |
|---|---|---|
| JP | 5-289123 | 11/1993 |
| JP | 11-135830 | 5/1999 |
| JP | 11-223701 | 8/1999 |
| JP | 2002-217488 | 8/2002 |

OTHER PUBLICATIONS

Stanley M. Smith, et al. "Static and Dynamic Polarizabilities of Conjugated Molecules and Their Cations", J. Phys. Chem. A, vol. 108, Nov. 19, 2004, pp. 11063 to 11072.

* cited by examiner

*Primary Examiner*—Bernard E Souw
*Assistant Examiner*—Andrew Smyth
(74) *Attorney, Agent, or Firm*—Oblon, Spivak, McClelland, Maier & Neustadt, L.L.P.

(57) ABSTRACT

A refractive index variable element includes a structure including quantum dots having discrete energy levels and a dielectric matrix surrounding the quantum dots, and an electron injector injecting an electron into the quantum dots through the dielectric matrix.

9 Claims, 10 Drawing Sheets

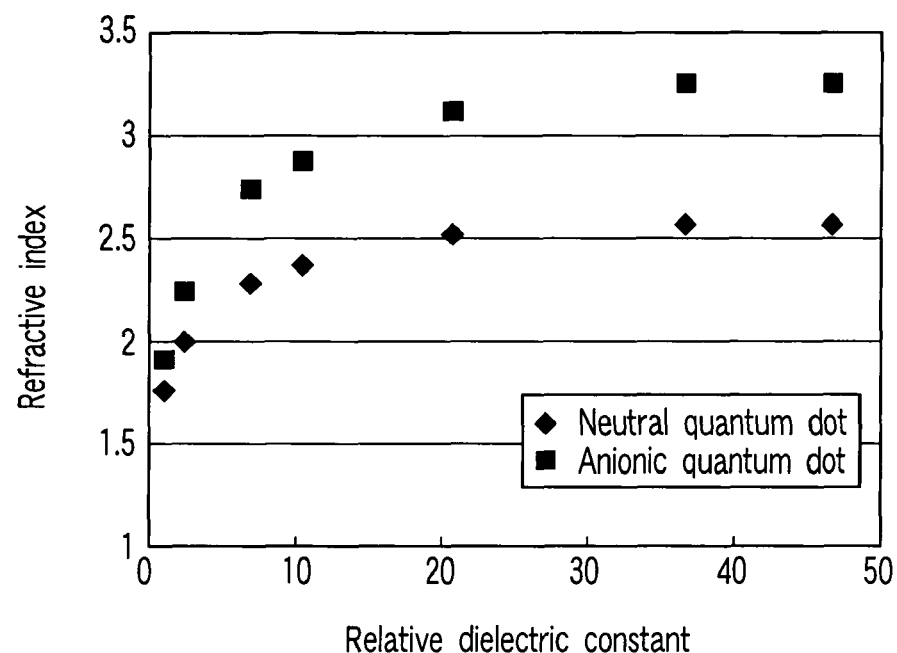
F I G. 9
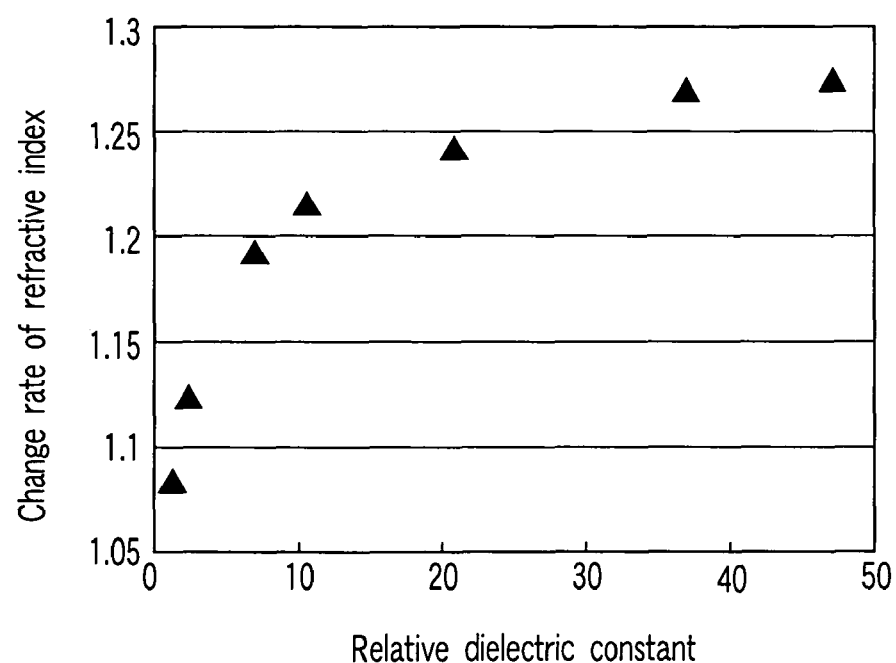
F I G. 10

REFRACTIVE INDEX VARIABLE ELEMENT AND METHOD OF VARYING REFRACTIVE INDEX

CROSS-REFERENCE TO RELATED APPLICATIONS

This application is based upon and claims the benefit of priority from prior Japanese Patent Application No. 2004-285001, filed Sep. 29, 2004, the entire contents of which are incorporated herein by reference.

BACKGROUND OF THE INVENTION

1. Field of the Invention

The present invention relates to a refractive index variable element that permits greatly varying the refractive index thereof by utilizing electrons and light and to a method of varying refractive index.

2. Description of the Related Art

In an optical or electronic function element or system which uses light as an information medium, it is absolutely necessary to control the refractive index of a component material or element. This is because the propagation characteristics of light are governed by the refractive index. Therefore, it is important to design an element so as to establish prescribed refractive index distribution, to arrange a material with a prescribed refractive index in the element, or to vary the refractive index of the element, not only in an optical waveguide and an optical fiber but also in an optical switching device and an optical recording device.

The known methods for greatly varying the refractive index utilize, for example, (1) Stark shift, (2) Franz-Keldysh effect, (3) Pockels effect, (4) Kerr effect, (5) orientation variation, (6) level splitting by magnetic field, (7) Cotton-Mouton effect, (8) optical Stark shift, (9) absorption saturation, (10) electromagnetically induced transparency (EIT), (11) photoisomerization, (12) structural change by light irradiation, (13) photoionization, (14) piezoreflection effect, (15) thermal band shift, (16) thermal isomerization, and (17) thermally-induced structural change. Techniques of varying the refractive index with the Pockels effect are disclosed in, for example, Japanese Patent Disclosure (Kokai) No. 2002-217488, Japanese Patent Disclosure No. 11-223701, and Japanese Patent Disclosure No. 5-289123.

The refractive index can be represented by a complex number in which a real part thereof denotes the refractive index in the narrow sense and an imaginary part thereof denotes absorption. In the mechanisms for the refractive index variation cited above, the variation in the real part of the complex refractive index is large in the absorption region and the absorption edge, but is small, i.e., not larger than 1%, in the non-absorption region. Also, an optical function device utilizing variation in absorbance, such as a light-absorption type optical switch, is being studied. However, the absorption implies that the intensity of the light beam carrying the information is lowered. Such being the situation, it is desirable that the real part of the complex refractive index can be greatly varied in a non-absorption wavelength region. Among the refractive index variable materials, the liquid crystal exhibits an exceptionally large variation not smaller than 10% in the real part of the complex refractive index in the non-absorption wavelength region. This is because the variation in the refractive index in the liquid crystal is brought about by the variation in orientation, not by the variation in the electronic polarizability. Taking into consideration of application of a refractive index variable material to an optical function device, however, a liquid refractive index variable material such as liquid crystal can be applicable to significantly limited fields.

BRIEF SUMMARY OF THE INVENTION

A refractive index variable element according to an aspect of the present invention comprises a structure including quantum dots having discrete energy levels and a dielectric matrix surrounding the quantum dots, and an electron injector injecting an electron into the quantum dots through the dielectric matrix.

A refractive index variable element according to another aspect of the present invention comprises a structure including quantum dots having discrete energy levels and a dielectric matrix surrounding the quantum dots, and an electron discharger discharging an electron from the quantum dots through the dielectric matrix.

A refractive index variable element according to still another aspect of the present invention comprises a structure including quantum dots having discrete energy levels and a dielectric matrix surrounding the quantum dots, wherein quantum dots converted into anions by injection of an electron or quantum dots converted into cations by discharge of an electron are present nonuniformly so as to make refractive index distribution of the structure nonuniform.

A method of varying a refractive index according to still yet another aspect of the present invention comprises: preparing a structure including quantum dots having discrete energy levels and a dielectric matrix surrounding the quantum dots, and injecting an electron into or discharging an electron from the quantum dots to vary a refractive index of the structure.

BRIEF DESCRIPTION OF THE SEVERAL VIEWS OF THE DRAWING

FIG. 9 is a graph showing the relationship between the relative dielectric constant of the dielectric matrix forming the structure and the refractive index in Example 6;

FIG. 10 is a graph showing the relationship between the relative dielectric constant of the dielectric matrix forming the structure and the ratio of refractive index in the case of the anionic quantum dot relative to the case of neutral quantum dot in Example 6;

DETAILED DESCRIPTION OF THE INVENTION

Figure 1:
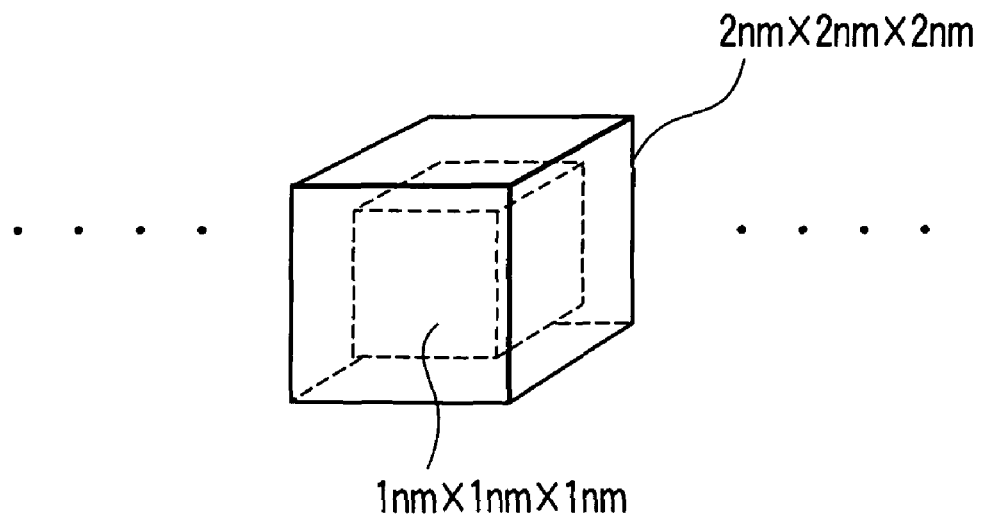
FIG. 1 is a perspective view showing a model of a quantum dot according to an embodiment of the present invention.

In an embodiment of the present invention, the structure constituting the refractive index variable element comprises quantum dots (or islands) having discrete energy levels and a dielectric matrix (or a barrier) surrounding the quantum dots.

In an embodiment of the present invention, the quantum dot included in the structure denotes a zero-dimensional electron system whose state density energies are made discrete by confining an electron in a dot-like region having a width of approximately de Broglie wavelength. At least one material selected from the group consisting of a metal fine particle, a semiconductor fine particle, a fullerene molecule, a carbon nanotube, and an organic molecule is used as the quantum dot.

In the embodiment of the present invention, it is desirable that the dielectric matrix forming the structure to have a relative dielectric constant of 7 or more.

In an embodiment of the present invention, the electron injector (or the electron discharger) is formed of, for example, a pair of electrodes having the structure sandwiched therebetween, and a probe of a near-field scanning optical microscope (NSOM).

When the electron injector or the electron discharger is formed of a pair of electrodes having the structure sandwiched therebetween, at least one of the paired electrodes may be arranged corresponding to a part of the structure. In this case, it is possible that at least one of the paired electrodes may be divided into a plurality of parts. Such a configuration enables to select any part of the structure where the electron injection or the electron discharge is performed and to selectively vary the refractive index in the selected part.

When the electron injector or the electron discharger is formed of a pair of electrodes having the structure sandwiched therebetween, the both electrodes may be opaque to light when the light is transmitted only through the structure between the two electrodes. In many cases where the light irradiation is performed through the paired electrodes, however, it is necessary that the both electrodes are transparent to light, or one electrode is opaque to light and the other electrode is transparent to light.

The refractive index variable element according to an embodiment of the present invention may further comprise a light source which irradiates the structure with light.

In an embodiment of the present invention, possible mechanisms by which an electron is injected into the quantum dots through the dielectric matrix or an electron is discharged from the quantum dots include: (1) injection (or discharge) of an electron overcoming the barrier, (2) a tunneling effect, and (3) hopping conduction. For example, in the case (1), where an electron is coming through the air or vacuum in accordance with an electric field, it is considered that the electron overcoming the barrier of the air or the vacuum is injected into the structure. In the case (2), if the dielectric matrix is thin, the tunneling is likely to take place. In the case (3), if the dielectric matrix is amorphous or contains impurities or ions, localized levels are formed and, thus, the electron is conducted by hopping.

The tunneling effect of the case (2) will now be described more in detail. The tunneling effect denotes the phenomenon that, in a quantum system including a barrier with a potential height $V_0$, when an electron having an energy E smaller than the potential $V_0$ collides against the barrier, the electron tunnels the barrier. The tunneling effect is generated in the case where the probability t is not zero in either the inside or the outside of the barrier. According to the Schrödinger equation, the transmittance through the barrier, i.e., the probability t of the tunneling effect, is represented by the formula given below:

$$t = \frac{4E(V_0 - E)}{V_0^2 \sinh^2\left(\frac{a}{2b}\right) + 4E(V_0 - E)},$$

$$b = \sqrt{\frac{2m_0(V_0 - E)}{\hbar^2}},$$

where $m_o$ denotes the mass of electron, h denotes the Dirac constant ($h/2\pi$), and a denotes the thickness of the barrier.

The formula given above indicates that the tunneling tends to be occurred easily with decrease of the thickness (a) of the barrier.

When the electron is injected into the quantum dots having discrete energy levels dispersed in the dielectric matrix, three conditions given below are necessary to cause Coulomb blockade for accumulating the electron:

$$kT \ll E_C,$$

$$R_T \gg \frac{h}{e^2} = R_Q,$$

$$\mathrm{Re}(Z_t(\omega)) \gg R_Q,$$

where $E_c$ denotes a charging energy, which is represented by the formula given below:

$$E_C = \frac{e^2}{2C_j},$$

where $C_j$ denotes a junction capacitance, which is represented by the formula given below:

$$C_j = \frac{\varepsilon S}{a},$$

where k denotes the Boltzmann constant, T denotes a temperature, $R_T$ denotes the junction tunneling resistance, $R_Q$ denotes the standard quantum resistance (25.8 kΩ), $\mathrm{Re}(Z_t(\omega))$ denotes the real part of the impedance of the external electromagnetic field environment, E denotes the dielectric constant, S denotes the junction area, and a denotes the thickness of the barrier.

As apparent from the formulas given above, a small junction area (S) and a large barrier thickness (a) are required for satisfying the three conditions given above. Since the junction area (S) denotes the surface area of the quantum dot, it is necessary to reduce the size of the quantum dot. In order to cause the Coulomb blockade, it is necessary that the barrier thickness (a) is large. However, in order to bring about the tunneling effect, it is necessary that the barrier thickness (a) is small to some extent. Thus, the barrier thickness (a) should be set to an appropriate range.

The Coulomb blockade phenomenon can be brought about when several conditions are satisfied simultaneously. First, it is necessary that the dielectric matrix providing the barrier should be thin enough to permit the electron to tunnel the barrier. Secondly, it is necessary that the charging energy of the dielectric matrix (the energy corresponding to the excited energy level of the quantum dot) should be higher than the environmental thermal energy kT (where k is the Boltzmann constant, and T is an absolute temperature). Thus, although the electrostatic capacity of the barrier should be low, there is a limitation that the thickness of the barrier, which is one of the factors for determining the electrostatic capacity, should be thin enough to produce the tunneling effect as described above. Therefore, the area, i.e., the surface area of the quantum dot, provides a decisive factor, which inevitably needs to reduce the size of the quantum dot.

In view of the energy level, the Coulomb blockade is determined by the relationship between the Fermi level that is the energy level of the electrode, and the energy level $E_c$ of the quantum dot to which the electron is injected by the tunneling effect. To be more specific, it suffices for the $E_c$ to be changed in an amount not smaller than the environmental temperature energy by the injection of a single electron, which is represented by the relative relationship between the energy level of the electrode and the energy level of the quantum dot.

On the other hand, the refractive index relates to the energy gap between the ground level (HOMO: highest occupied molecular orbital; SOMO: singly occupied molecular orbital) and the excited level (LUMO: lowest unoccupied molecular orbital) and is determined by the relative relationship between the two levels.

Although the two relationships described above are not equal to each other, if one level is changed, then the energy gap relating to this energy level change is also changed in general. Thus, the occurrence of the Coulomb blockade is one of the criteria for judging whether the refractive index variation can be occurred by this mechanism through electrical measurement techniques.

It should be noted that, although the Coulomb blockade phenomenon is observed by the tunneling current, the energy level change can be brought about even when the electron is injected through other mechanism than the tunneling current. For example, the blocking of the tunneling current can be observed even when the electron overcoming the barrier matrix is injected.

In an embodiment of the present invention, since the effect of the refractive index variation in the structure can be maintained after the electron injection into the structure, the electron injector can be removed from the structure after the electron injection. If the above operation is compared to a recording apparatus, the electron injector corresponds to a write element, and the structure into which an electron is injected corresponds to a media (refractive index variable media).

The present invention provides a new mechanism for achieving the refractive index variation. The refractive index variable element according to an embodiment of the present invention permits producing a larger refractive index variation than that produced by the conventional elements.

The mechanism for the refractive index variation in the present invention is as follows. Specifically, if an electron is injected into a quantum dot, an outermost shell orbital (i.e., SOMO) is newly formed on the outside of the outermost shell orbital (i.e., HOMO) of the original quantum dot that greatly contributes to the determination of the refractive index. If such a quantum dot is surrounded by the dielectric material, it is possible to obtain a greater effect of refractive index variation. Inversely, if an electron is discharged from a quantum dot, the outermost shell orbital (i.e., HOMO) greatly contributing to the determination of the refractive index changes a lot. If such a quantum dot is surrounded by the dielectric material, it is possible to obtain a greater effect of refractive index variation.

The refractive index variable element according to an embodiment of the present invention provides effects greatly different from those of the conventional elements in which the refractive index variation in the structure is obtained through a second- or third-order nonlinear optical effect represented by the Pockels effect. The differences are summarized in the following.

(1) In the prior art, the electrons remain in the electrode for applying an electric field to the structure. On the other hand, in the embodiment of the present invention, the electron is injected from the electron injector into the quantum dot in the structure. Alternately, the electron is discharged from the quantum dot in the structure to the electron discharger.

(2) In the prior art, when voltage application to the structure is stopped, the nonlinear optical effect is lost and the effect of the refractive index variation is also lost. On the other hand, in the embodiment of the present invention, the effect of the refractive index variation is retained as far as the electron remains in the quantum dot.

(3) According to the Pockels effect utilized by the prior art, the degree of the refractive index variation is at most about $10^{-3}$. On the other hand, in the embodiment of the present invention, the degree of the refractive index variation becomes $10^{-1}$ or more.

(4) In general, there are known several methods of varying absorption spectrum such as photochromism. Also, as derived from the Kramers-Kronig relation, the refractive index variation in the vicinity of the absorption edge is relatively large. Thus, methods of varying the real part of the complex refractive index by changing the absorption spectrum or the absorption coefficient are well employed. However, it is difficult to vary greatly the refractive index in a transparent region. On the other hand, the embodiment of the present invention can provide a large refractive index variation even in the transparent region.

(5) In the case of a general three-dimensional bulk semiconductor, a large number of electrons are present on the branches of the same excitation band. As a result, even if a single electron is injected, a change in the distribution of the electrons occupying the band (energy level) is very small. On the other hand, in the embodiment of the present invention, the energy levels of the quantum dots are discrete, with the result that the number of electrons that can be present in a single energy level is as small as to be counted. Therefore, when a single electron is newly injected into the quantum dot, the injected electron occupies the energy level where an electron has not been present. Also, since the energy levels of the quantum dot are discrete, the peak of the absorption spectrum has a small width, which implies that a transparent region is broad.

(6) The refractive index variable element according to the embodiment of the present invention is intended to use as a waveguide and, thus, differs in from a laser or an amplifier accompanied by absorption or a resonance state. It follows that the scope of application as an optical device is broadened with increase in the width of the transparent wave region. Further, the refractive index variable element according to the embodiment of the present invention differs in principle from a quantum dot exciton effect in which a third-order nonlinear optical effect is amplified through an absorption resonance effect. The refractive index variable element according to the embodiment of the present invention exhibits an effect that the refractive index is varied even in a transparent region, which differs from that of the quantum dot exciton effect.

(7) In the embodiment of the present invention, the refractive index is not changed in the dielectric matrix other than the quantum dots, with the result that an average refractive index variation is increased as a whole with increase in the density of the quantum dots. Where the refractive index variable element according to the embodiment of the present invention is used as a waveguide, it is effective to set the density of the quantum dots such that the average refractive index variation exceeds at least 1.5%. The value of 1.5% noted above is the general value of refractive index variation of the waveguide that is used nowadays.

An additional description in view of principles will now be given in conjunction with the differences between the present invention and the prior art noted above. The light incident on the quantum dot causes to vibrate an electron shell by the electric field thereof (excitation). The vibrated electron shell emits light. The emission process is related to Einsteins B-coefficient, and some extent of time is required from excitation to emission even in a non-resonance region. The light is propagated while repeating the excitation and emission. The time required for the excitation and emission determines the phase velocity $V_p$ of light propagation. Where C is the light velocity in a vacuum, $V_p/C$ is the real part of the complex refractive index that is to be varied in the present invention. The refractive index is related to the molecular polarizability through the Lorentz-Lorenz equation as given below:

$$\frac{n^2-1}{n^2+2} \cdot V_{\text{mol}} = \frac{4\pi}{3} \cdot N_A \cdot \alpha \equiv R_0,$$

$$\frac{n^2-1}{n^2+2} \cdot V = \frac{4\pi}{3} \cdot \alpha = \frac{R_0}{N_A},$$

$$\frac{n^2-1}{n^2+2} = \frac{4\pi}{3} \frac{\alpha}{V},$$

where $V_{mol}$ denotes a volume per mol ($N_A$=6.02×10$^{23}$).

Since $\rho$=M/$V_{mol}$, the above equation can be rewritten in the following equation (Lorentz-Lorenz equation):

$$\left\{\frac{(n^2-1)}{(n^2+2)}\right\}\frac{M}{\rho} = \left(\frac{4\pi}{3}\right)N_A\alpha,$$

where n denotes a refractive index, M denotes a molar mass (mass per mol), $\rho$ denotes a density, $N_A$ denotes the Avogadro's number, and $\alpha$ denotes a polarizability.

For varying the molecular polarizability, a method of applying an electric field to a material to distort an electron orbital by use of a second- or third-order nonlinear optical effect is generally used. However, this method can vary the molecular polarizability only a little. On the other hand, where an electron is injected into a quantum dot of a nanoscale size, an orbital is newly formed and Coulomb repulsion is caused so as to change markedly the chemical potentials of HOMO and LUMO and the HOMO-LUMO gap. It follows that the polarizability is markedly varied by these effects. Incidentally, where the electron is discharged from a quantum dot, a new orbital is not formed, and thus the variation is small compared with the case of the electron injection. Nevertheless, a large variation can be expected also in the latter case relative to that produced by the conventional technique utilizing the nonlinear optical effect.

In general, if electrons are excessively supplied to the quantum dot, the quantum dot tends unlikely to be present stably. On the other hand, when the quantum dot is surrounded by the dielectric material as in the embodiment of the present invention, the energy as a whole is stabilized by dielectric relaxation, and also the polarizability variation is rendered large. The electron can be trapped by the quantum dot on the electron injection by making LUMO of the dielectric matrix higher than the LUMO of the quantum dot.

Figure 2:
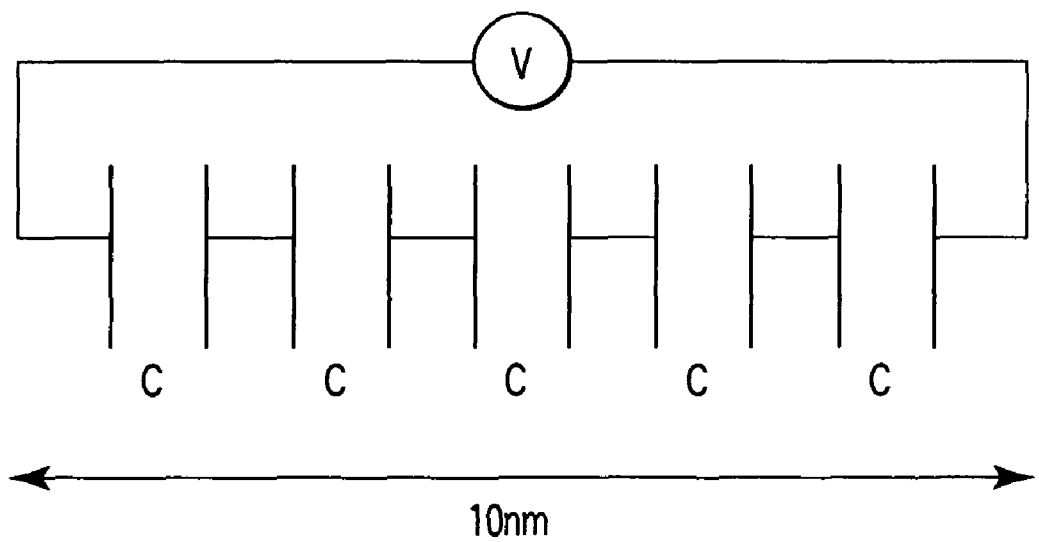
FIG. 2 is a circuit diagram showing the state that five capacitors each formed of a quantum dot according to an embodiment of the present invention are connected in series.

The driving voltage in the electron injection can be roughly calculated by assuming a circuit consisting of capacitors connected in series between a pair of electrodes, the capacitor being formed of the dielectric material present between the quantum dots. FIG. 1 shows a model capacitor assuming that a cubic quantum dot having a side of 1 nm is surrounded by a dielectric matrix having a thickness of 0.5 nm so as to form the capacitor having a side of 2 nm. Five capacitors are connected in series so as to form a circuit as shown in FIG. 2. The voltage V is calculated on the assumption that a single electron is accumulated for each capacitor. There is a relationship of V=Q/C, where V denotes a voltage, Q denotes a charge and C denotes the capacitance of the capacitor. Also, the capacitance C is represented by the following formula:

$$C=\epsilon_0\epsilon_r S/d,$$

where $\epsilon_0$ denotes the dielectric constant of vacuum ($\epsilon_0$=8.85×10$^{-12}$ F/m), $\epsilon_r$ denotes the refractive dielectric constant, S denotes the area of the capacitor, and d denotes the distance between the adjacent capacitors.

In the model shown in FIG. 2, S=1×10$^{-18}$ m$^2$, and d=1×10$^{-9}$×5 [m]. It should be noted, however, that the total thickness including the quantum dots is 10 nm. Since the electric charge (Q) corresponds to the electric charge of the five electrons injected into the quantum dots, Q=e×5=1.6×10$^{-19}$ [C]×5=8×10$^{-19}$ [C].

If $\epsilon_r$=10, then C=1.8×10$^{-20}$, whit a result that the voltage V is about 44V. If the total thickness is assumed to be 10 nm, the voltage V is 440V in the case of $\epsilon_r$=10. In the case of $\epsilon_r$=100, however, the voltage V is 44V. Further, in the case of $\epsilon_r$=1,000, the voltage V is 4.4V, which means that the electron can be injected easily. In the above model, when the relative dielectric constant E r is about 880, the driving voltage V is about 5V. In view of the driving voltage, it is desirable that the dielectric matrix should have a relative dielectric constant on this level. Where it is intended to increase the thickness, it is possible to increase the number of electrodes. Incidentally, no problem is caused even if the structures are arranged in parallel with the electrodes.

The driving voltage in the electron discharge can be considered similarly as in the electron injection described above. Incidentally, in the embodiment of the present invention, any one of the electron injection into the quantum dot and the electron discharge from the quantum dot is performed selectively. In other words, both the electron injection and the electron discharge are not performed simultaneously.

EXAMPLES

Example 1

In this Example, simulation is carried out with respect to how an electron polarizability tensor, which relates to a refractive index in the vicinity of the visible region, is varied by injecting a single electron into a quantum dot in vacuum. The polarizability can be classified into the polarizability by orientation, the polarizability by vibration, and the polarizability relating to electron excitation. The wavelength ranges of light (electromagnetic wave) relating to the above three classes are: a radio- and milli-wave range; a middle- and far-infrared range; and a near-infrared, visible and ultraviolet range, respectively. Since the simulation in the present Example is related to the electron excitation, the simulation corresponds to the polarizability in the near-infrared, visible and ultraviolet range and in a wavelength range without including a resonance effect, i.e., without absorption. As described above, the relationship between the refractive index and the polarizability is represented by the Lorentz-Lorenz equation.

First, description will be given to the result of calculation in respect of the polarizability variation where $Si_{10}H_{16}$ is used as a quantum dot and a single electron is injected into the quantum dot so as to convert the quantum dot into $Si_{10}H_{16}+e^-$.

The conditions for the calculation are as follows. Electronic structure calculation is carried out based on the density functional theory (DFT) using Becke's three-variable exchange potential and Lee-Yang-Pearl's correction for correlation potential (B3LYP). CEP-31G basis set in which the core electron is approximated by the effective core potential (ECP) is used. The stable structure of each of the neutral quantum dot and the quantum dot after the electron injection is obtained by the analytical energy gradient techniques. Whether the stationary point on the Born-Oppenheimer energy plane is the energetically most stable point or nor is confirmed by harmonic vibrational frequency analyses.

Figure 3:
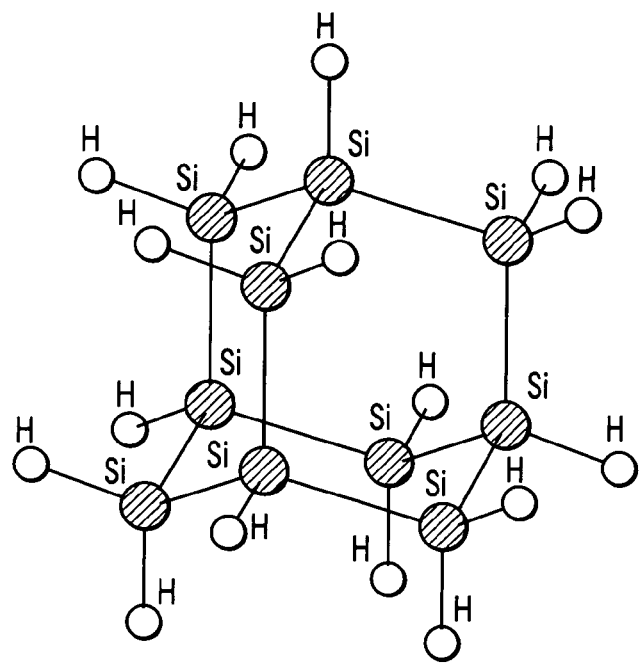
FIG. 3 is a schematic view showing $Si_{10}H_{16}$ in an minimum energy structure.

FIG. 3 is a schematic view showing $Si_{10}H_{16}$ in an minimum energy structure. The energy E and the polarizability P of the neutral molecule of $Si_{10}H_{16}$ are as follows:

E=−48.1834515651 au (1 au=27.2116 eV), $$P = \begin{pmatrix} xx & xy & xz \\ & yy & yz \\ & & zz \end{pmatrix} = \begin{pmatrix} 268.0 & 0.0 & 268.0 \\ & 268.0 & 0.0 \\ & & 268.0 \end{pmatrix},$$

(polarizability tensor component),
unit: au=Bohr$^3$,
average polarizability=⅓(xx+yy+zz)=268.0 au,
LUMO: −0.01630,
HOMO: −0.27565.

The energy E and the polarizability P of the anionic molecule of $Si_{10}H_{16}+e^-$ are as follows:
E=−48.1908485619 au, $$P = \begin{pmatrix} xx & xy & xz \\ & yy & yz \\ & & zz \end{pmatrix} = \begin{pmatrix} 293.601 & 5.568 & 14.142 \\ & 295.314 & 28.995 \\ & & 322.444 \end{pmatrix},$$

average polarizability=303.8 au,
LUMO: 0.09850,
HOMO: −0.00559.

It can be understood that the anionic molecule generated by injecting a single electron into the quantum dot of $Si_{10}H_{16}$ is stabilized in energy.

Table 1 shows the average polarizability (P), the average polarizability (P) variation, the refractive index (n, estimated value), and the refractive index (n) variation for $Si_{10}H_{16}$.

TABLE 1

|  | P (average) [au] | P variation [%] | n [—] | n variation [%] |
|---|---|---|---|---|
| neutral molecule | 268.0 | — | 3.955 | — |
| anionic molecule | 303.8 | 13.4 | 6.978 | 76.4 |

For reference, the refractive index of the bulk Si in the non-absorption region is about 3.5, which does not greatly differ from the result of the calculation given in Table 1. It should be noted that the density of the bulk Si is assumed to be constant (the density is set to 2.33 g/cm$^3$), and the molar mass is set to be equal to $S_{10}$ for simplification. As apparent from Table 1, the average polarizability variation and the refractive index variation are very large. When the calculation is carried out on the basis that two electrons are injected into the quantum dot, it has been found that the average polarizability would be varied more prominently. It has been found that the quantum dot into which a single electron is injected is somewhat energetically stabilized compared to the case of two-electron injection, supporting that the Coulomb blockade phenomenon is generated in this case. Since the calculation is carried out on the assumption that the environment of the quantum dot is in a vacuum state (vacuum level), the junction capacitance is very small and the electrostatic energy is larger than kT under room temperature.

Figure 4:
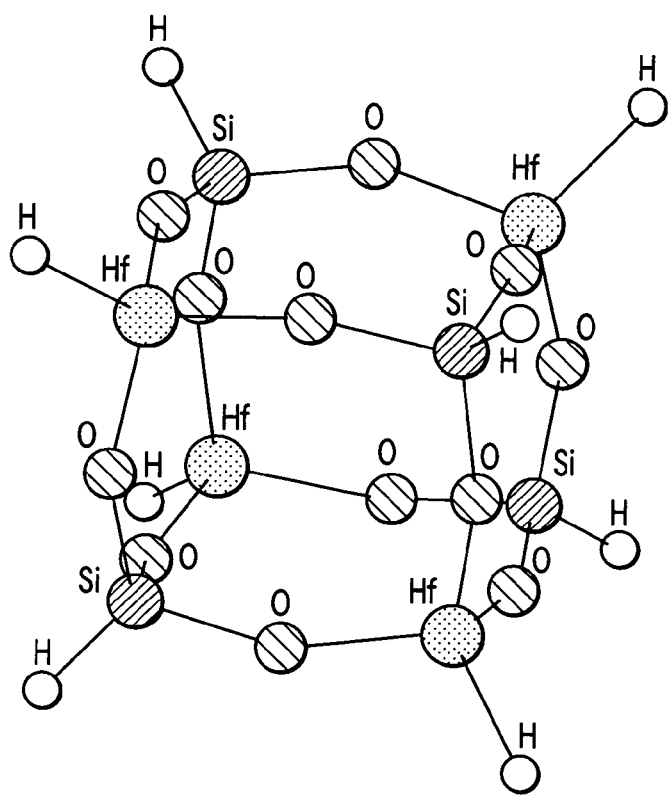
FIG. 4 is a schematic view showing $Hf_4Si_4O_{12}H_8$ in an minimum energy structure.

Next, the calculation similar to the above example is carried out in respect of the quantum dot of $Hf_4Si_4O_{12}H_8$. FIG. 4 is a schematic view showing $Hf_4Si_4O_{12}H_8$ in an energy-minimum structure. The energy E and the polarizability P of the neutral molecule of $Hf_4Si_4O_{12}H_8$ are as follows:

E=−408.582554343 au, $$P = \begin{pmatrix} xx & xy & xz \\ & yy & yz \\ & & zz \end{pmatrix} = \begin{pmatrix} 248.84 & -0.015 & -0.037 \\ & 248.836 & 0.019 \\ & & 248.915 \end{pmatrix},$$

average polarizability=248.9 au,
LUMO: −0.04349,
HOMO: −0.29859.

The energy E and the polarizability P of the anionic molecule of $Hf_4Si_4O_{12}H_8+e^-$ are as follows:
E=−408.606974089 au, $$P = \begin{pmatrix} xx & xy & xz \\ & yy & yz \\ & & zz \end{pmatrix} = \begin{pmatrix} 315.752 & -0.009 & 0.028 \\ & 315.712 & 0.036 \\ & & 315.635 \end{pmatrix},$$

average polarizability=315.7 au,
LUMO: 0.06944,
HOMO: −0.00781.

Table 2 shows the average polarizability (P), the average polarizability (P) variation, the refractive index (n, estimated value), and the refractive index (n) variation for $Hf_4Si_4O_{12}H_8$.

TABLE 2

|  | P (average) [au] | P variation [%] | n [—] | n variation [%] |
|---|---|---|---|---|
| neutral molecule | 248.9 | — | 3.1 | — |
| anionic molecule | 315.7 | 26.8 | 7.5 | 140 |

Table 2 shows that the average polarizability variation and the refractive index variation for $Hf_4Si_4O_{12}H_8$ are larger than those for $Si_{10}H_{16}$. It should be noted that the outermost shell orbital of Hf belonging to the sixth period in the periodic table is larger than that of Si belonging to the third period, and thus the effect on the refractive index produced by the electron injection is larger in Hf.

Figure 5:
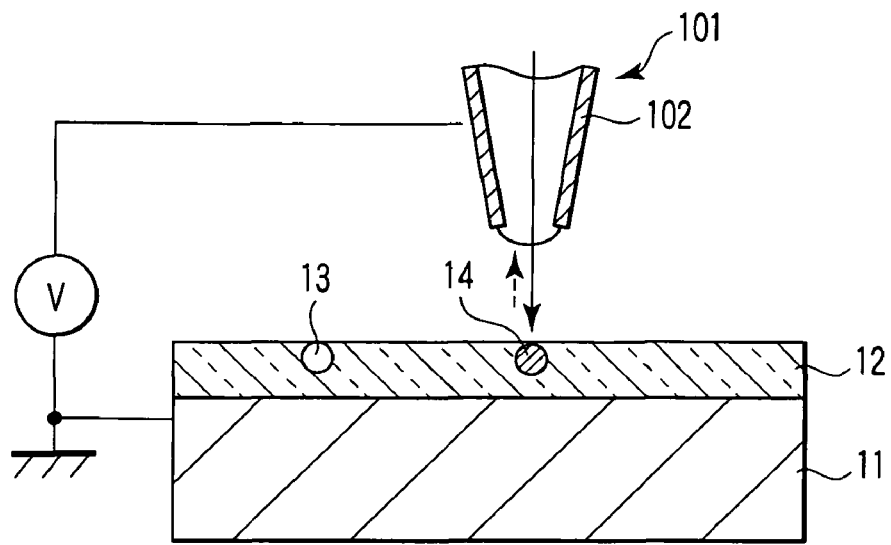
FIG. 5 is a cross-sectional view showing the refractive index variable element in Example 1.

Next, the refractive index variation caused by electron injection into the quantum dot present in a dielectric matrix is examined in respect of the refractive index variable element as shown in FIG. 5.

A Si substrate 11 is oxidized to form a $SiO_2$ film 12 with a thickness of 200 nm on the surface thereof. A polycrystalline silicon (polysilicon) thin film is deposited on the $SiO_2$ film 12 by chemical vapor deposition (CVD), followed by oxidizing the polysilicon film to form $Si_{10}$ quantum dots 13. Then, a NSOM probe 101 is arranged over the sample so as to observe the sample in the illumination/collection mode. The probe 101 has a tapered tip and a metal coat 102 is applied to the tapered surface.

In the first step, a region of about 30 nm square in which a single $Si_{10}$ quantum dot exists is inspected by an atomic force microscope (AFM). The value of 30 nm given above corresponds to spatial resolution of NSOM. Then, an electric field is applied between the metal coat 102 of the probe 101 and the Si substrate 11 so as to inject an electron into the $Si_{10}$ quantum dot 13, thereby converting the quantum dot 13 into an anion 14. Thereafter, the reflectance variation of the sample is measured in the illumination/collection mode so as to calculate the refractive index variation.

The reflectance variation of the sample includes the reflectance variations of both the $SiO_2$ film 12 and the $S_{10}$ quantum dot 13. Such being the situation, the refractive index variation of the $Si_{10}$ quantum dot 13 is estimated in view of the volume ratio of the $SiO_2$ film 12 to the $Si_{10}$ quantum dot 13, with the result that the refractive index variation of the $Si_{10}$ quantum dot 13 is calculated to be 2.1. When the refractive index of the $Si_{10}$ quantum dot 13 is assumed to be 3.5, the variation corresponds to 60%, supporting that the calculation described above is substantially correct.

Example 2

In the present Example, $C_{60}$ fullerene is used as the quantum dot. It is known to the art that $C_{60}$ fullerene brings about Coulomb blockade, as described in, for example, D. Porath and O. Millo, J. Appl. Phys., 81 (1997) p. 2241.

Figure 6:
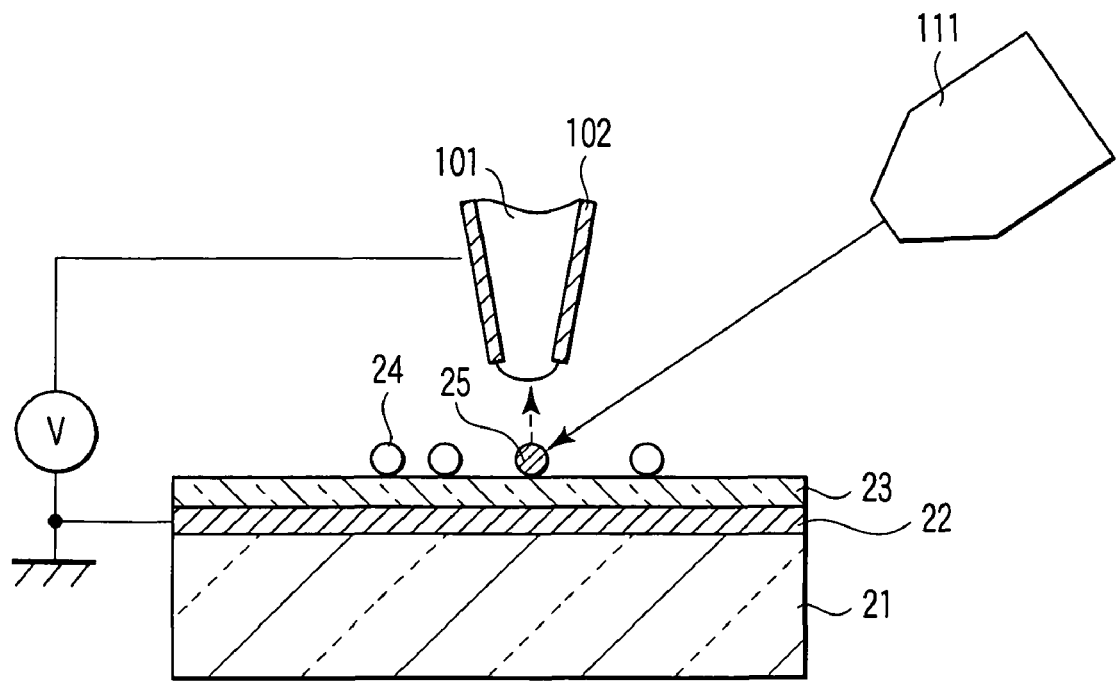
FIG. 6 is a cross-sectional view showing the refractive index variable element in Example 2.

The refractive index variation caused by electron injection into the quantum dot in the dielectric matrix is examined in respect of the refractive index variable element shown in FIG. 6.

On an ITO electrode 22 formed on a glass substrate 21, a polymethylmethacrylate (PMMA) film 23 is formed in a thickness of about 500 nm by spin coating. Then, $C_{60}$ quantum dots 24 with a size of about 0.7 nm are sprayed onto the PMMA film 23. Thereafter, the sample is heated to 100° C. and maintained for 5 minutes, followed by cooling the sample to room temperature. Thus, the $C_{60}$ quantum dots 24 are tightly bonded to the PMMA film 23. A NSOM probe 101 with a metal coat 102 applied thereto is arranged over the sample so as to observe the sample in the collection mode. Also, an objective lens 111 is arranged above the sample so as to irradiate the sample with a laser beam. A part of the irradiated laser beam passes through the sample, and the remaining part of the laser beam is reflected by the sample. In this case, if the refractive index of the $C_{60}$ quantum dot 24 is varied, the reflectance is varied at the interface of the $C_{60}$ quantum dot 24, resulting in change of the amount of the reflected light collected by the probe 101.

It should be noted that the $C_{60}$ quantum dot 24 has a size of about 0.7 nm, whereas the spatial resolution of the NSOM probe 101 is about 30 nm. It follows that the NSOM probe 101 is incapable of observing the single $C_{60}$ quantum dot 24, but is capable of observing the closely-packed $C_{60}$ quantum dots 24.

When an electric field is applied between the metal coat 102 of the probe 101 and the ITO electrode 22 on the glass substrate 21 so as to inject an electron into a single $C_{60}$ quantum dot 24, thereby converting the quantum dot 24 into an anion 25, further electron injection into the anion 25 is prevented by the Coulomb blockade effect. Thereafter, an electron is injected into another $C_{60}$ quantum dot 24 positioned in the vicinity of the probe 101. In this fashion, electrons are injected uniformly into the $C_{60}$ quantum dots 24 in the vicinity of the probe 101.

The observation is performed while applying a high frequency voltage of 0 to −10V with a frequency of 1 kHz between the metal coat 102 of the probe 101 and the ITO electrode 22 on the glass substrate 21. It has been found that, where the $C_{60}$ quantum dots 24 are closely packed over a range of 30 nm or more, the amount of the reflected light reaching the probe 101 is varied due to the refractive index variation.

For comparison, comb-shaped electrodes are assembled and $LiNbO_3$ is deposited on the electrodes. Under this condition, an electric field of about $10^7$ V/m is applied between the electrodes so as to examine the refractive index variation produced by the Pockels effect. The optical path length is so short that it is impossible to obtain a detailed value. However, it has been found that the variation of the reflected light for the $C_{60}$ quantum dot 24 is at least 10 times as large as that for the $LiNbO_3$.

Example 3

Figure 7:
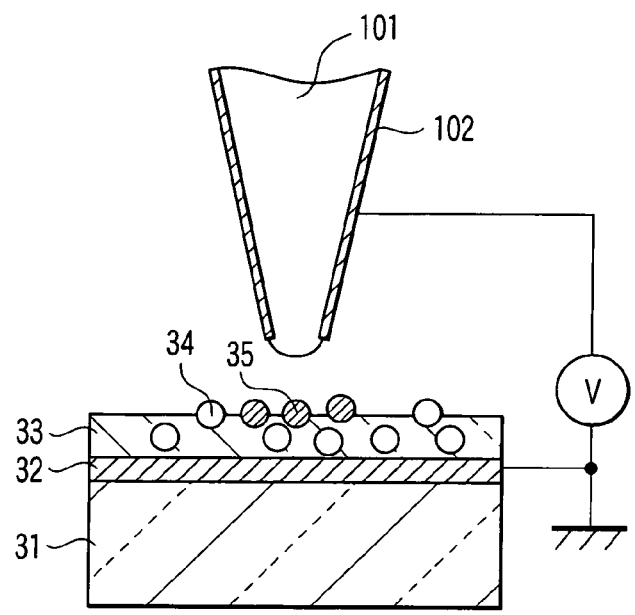
FIG. 7 is a cross-sectional view showing the refractive index variable element in Example 3.

In the present Example, a cobalt (Co) nano particle is used as the quantum dot, and the refractive index variation caused by charge injection into the quantum dot in a dielectric matrix is examined by using a refractive index variable element shown in FIG. 7.

On an ITO electrode 32 formed on a glass substrate 31, $SiO_2$ and cobalt (Co) are co-sputtered. It is found from TEM observation that the $SiO_2$ film 33 formed as a matrix has a thickness of 8 nm, and Co quantum dots with a size of about 1.4 nm are formed in the $SiO_2$ film 33. These Co quantum dots 34 are closely packed.

A NSOM probe is arranged as in Example 2 to measure the refractive index variation. A voltage is applied between the metal coat 102 of the probe 101 and the ITO electrode 32 formed on the glass substrate 31 so as to inject a charge into the Co quantum dot 34. In this case, a voltage of +20V or −20V is applied separately at a frequency of 1 kHz for about 100 ms so as to form an anion or cation 35. Since the charge is discharged when the voltage application is stopped, it has been observed that the refractive index is gradually brought back in an exponential manner to the original value. The time constant is about 9 minutes in the case of applying +20V, and the time constant is about 3 minutes in the case of applying −20V. In this fashion, it is possible to vary the refractive index temporarily.

It has been found that, if the size of the Co quantum dot 34 is increased or if the temperature is elevated, the time constant tends to be shortened. Because the injected charge is discharged even when the polarity of the voltage is reversed, it has been confirmed that the refractive index is brought back to the original value also in this case.

Example 4

Figure 8A:
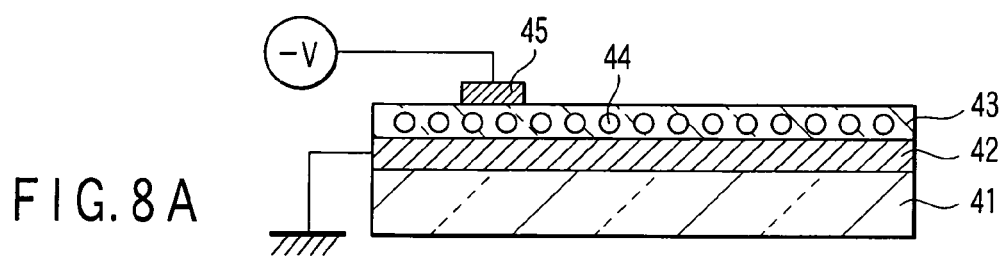
FIGS. 8A and 8B are a cross-sectional view and a plan view showing a waveguide structure formed in Example 4.
Figure 8B:
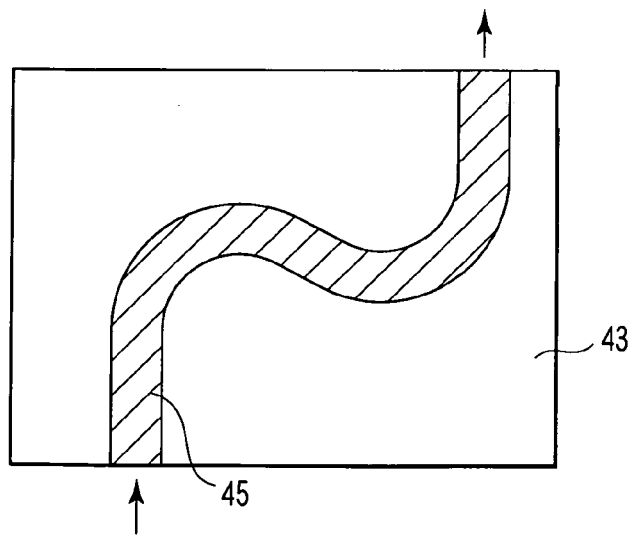

In the present Example, $C_{60}$ fullerene is used as the quantum dot so as to form a curved waveguide structure as shown in FIGS. 8A and 8B. FIG. 8A is a cross-sectional view and FIG. 8B is a plan view of the waveguide structure.

An ITO electrode 42 formed on a glass substrate 41 is coated with a polystyrene film 43 having $C_{60}$ quantum dots 44 dispersed therein. A copper thin plate 45 with a width of about 5 mm, which is curved, is formed in tight contact with the polystyrene film 43. An electron is injected into the $C_{60}$ quantum dot 44 by applying a voltage of −35V to the copper thin plate 45 under the state that the ITO electrode 42 is connected to the ground so as to vary the refractive index in the lower portion of the copper thin plate 45. Then, a laser beam is allowed to be incident on one edge surface of the polystyrene film 43 positioned below the copper thin film 45. As a result, the lower portion of the curved copper thin plate 45 can be used as a waveguide to guide the laser beam, with the result that the laser beam is emitted from the other edge surface of the polystyrene film 43 positioned below the copper thin plate 45. In this fashion, it is possible to form a waveguide very easily.

Example 5

In the present Example, the refractive index variation is simulated for the case where a single electron is injected into or discharged from the quantum dot present in a dielectric matrix. Here, the result is compared with that for the quantum dot in vacuum.

A silicon nanoparticle ($Si_{10}H_{16}$) as shown in FIG. 3 is used as the quantum dot. A structure in which the $Si_{10}H_{16}$ quantum dot is arranged in vacuum (where a dielectric matrix is not used), and a structure in which the $Si_{10}H_{16}$ quantum dot is arranged in benzene having a relative dielectric constant of 2.247 used as a dielectric matrix are assumed. In each of these cases, the polarizability variation is calculated for $Si_{10}H_{16}$ quantum dot in the form of an electrically neutral molecule, in the form of an anionic molecule having a single electron injected therein, or in the form of a cationic molecule having a single electron discharged therefrom, respectively. The polarizability is calculated based on a density functional theory (DFT) using Becke's three-variable exchange potential and Lee-Yang-Pearl's correction for correlation potential (B3LYP), where CEP-31G is used as the basis set. The refractive index is calculated in accordance with the Lorentz-Lorenz equation. In this case, the density of the $Si_{10}H_{16}$ quantum dot is estimated at 50% of the bulk Si, i.e., 1.165 g/cm³, so as to calculate the volume V of a single $Si_{10}H_{16}$ quantum dot. The result of the simulation is as follows:

Refractive index (n) of the $Si_{10}H_{16}$ quantum dot arranged in vacuum and the refractive index variation are as follows:

|  | n | variation |
| --- | --- | --- |
| Neutral $Si_{10}H_{16}$ quantum dot | 1.77 | — |
| Anionic $Si_{10}H_{16}$ quantum dot | 1.91 | 8% |
| Cationic $Si_{10}H_{16}$ quantum dot | 1.79 | 1%. |

Refractive index (n) of the $Si_{10}H_{16}$ quantum dot arranged in benzene and the refractive index variation are as follows:

|  | n | variation |
| --- | --- | --- |
| Neutral $Si_{10}H_{16}$ quantum dot | 1.99 | — |
| Anionic $Si_{10}H_{16}$ quantum dot | 2.24 | 12% |
| Cationic $Si_{10}H_{16}$ quantum dot | 2.02 | 2%. |

As apparent from the results given above, the refractive index variation in the case of injecting an electron into or discharging an electron from the quantum dot in the dielectric matrix is larger than that in the case where an electron is injected into or discharged from the quantum dot in vacuum.

Also, the singly occupied molecular orbital (SOMO) energy is calculated in each of the cases where an electron is injected into the $Si_{10}H_{16}$ quantum dot in vacuum and where an electron is injected into the $Si_{10}H_{16}$ quantum dot in benzene. The results are as follows:

in vacuum: −0.00559 au, in benzene: −0.06661 au.

The results clearly support that the SOMO of the $Si_{10}H_{16}$ quantum dot having an electron injected thereto is stabilized by the presence of the surrounding dielectric matrix.

Example 6

The refractive index variations are simulated for the cases where a single electron is injected into or discharged from the quantum dot surrounded by the dielectric matrix with various values of relative dielectric constant.

As in Example 5, a silicon nanoparticle ($Si_{10}H_{16}$) is used as a quantum dot, and structures in which the $Si_{10}H_{16}$ quantum dot is arranged in each of six types of the dielectric matrix different in the relative dielectric constant, respectively, are assumed. In each of these cases, the polarizability variation is calculated for $Si_{10}H_{16}$ quantum dot in the form of an electrically neutral molecule or in the form of an anionic molecule having a single electron injected therein, respectively, and further the refractive index is calculated in accordance with the Lorentz-Lorenz equation. All the calculating conditions are equal to those for Example 5.

FIG. 9 is a graph showing the relationship between the relative dielectric constant of the dielectric matrix forming the structure and the refractive index. FIG. 9 shows the followings. The refractive index of the anionic quantum dot having an electron injected thereto is higher than that of the neutral quantum dot regardless of the relative dielectric constant of the dielectric matrix. Also, the refractive index is increased with increase in the relative dielectric constant of the dielectric matrix in each of the anionic quantum dot and neutral quantum dot.

FIG. 10 is a graph showing the relationship between the relative dielectric constant of the dielectric matrix forming the structure and the ratio of refractive index of the anionic quantum dot relative to that of the neutral quantum dot. As apparent from the graph of FIG. 10, the refractive index variation of the anionic quantum dot is increased with increase in the relative dielectric constant of the dielectric matrix. In particular, the refractive index variation of the anionic quantum dot is increased when the relative dielectric constant of the dielectric matrix is 7 or more.

The refractive index and the refractive index variation in the case of the dielectric matrix with the relative dielectric constant of about 7 is about 60% relative to those in the case of the dielectric matrix with the relative dielectric constant of about 50.

Incidentally, the description given above covers the case where only the refractive index variation of the quantum dot is examined. However, where an electron is injected into the quantum dot, the wave function of the surrounding dielectric matrix is also changed, with the result that it is possible to further promote the refractive index variation.

Figure 11:
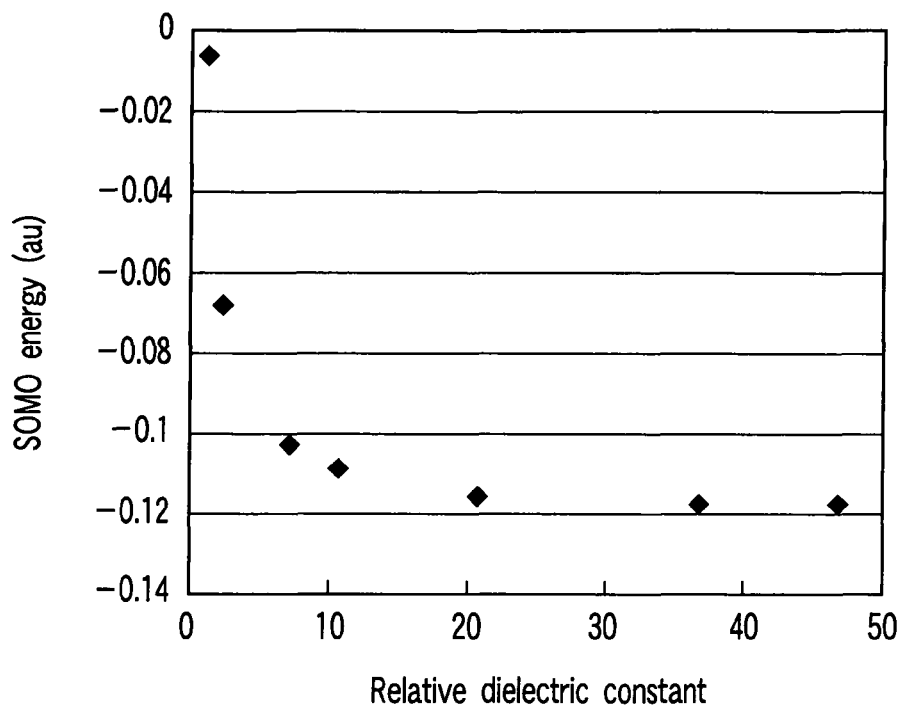
FIG. 11 is a graph showing the relationship between the relative dielectric constant of the dielectric matrix constituting the structure and the single occupied molecular orbital (SOMO) energy of the anionic quantum dot in Example 6.

FIG. 11 is a graph showing the relationship between the relative dielectric constant of the dielectric matrix forming the structure and the singly occupied molecular orbital (SOMO) energy of the anionic quantum dot. The graph of FIG. 11 clearly indicates that the single occupied molecular orbital of the anionic quantum dot having an electron injected thereto is more stabilized with the increase in the relative dielectric constant of the dielectric matrix surrounding the quantum dot. In particular, the SOMO energy is low when the relative dielectric constant is not smaller than 7. In this fashion, in the case of using a dielectric matrix having a high relative dielectric constant, the electron injected into the quantum dot is stabilized by the dielectric relaxation effect so as to make it possible to inject further electrons.

Example 7

Figure 12:
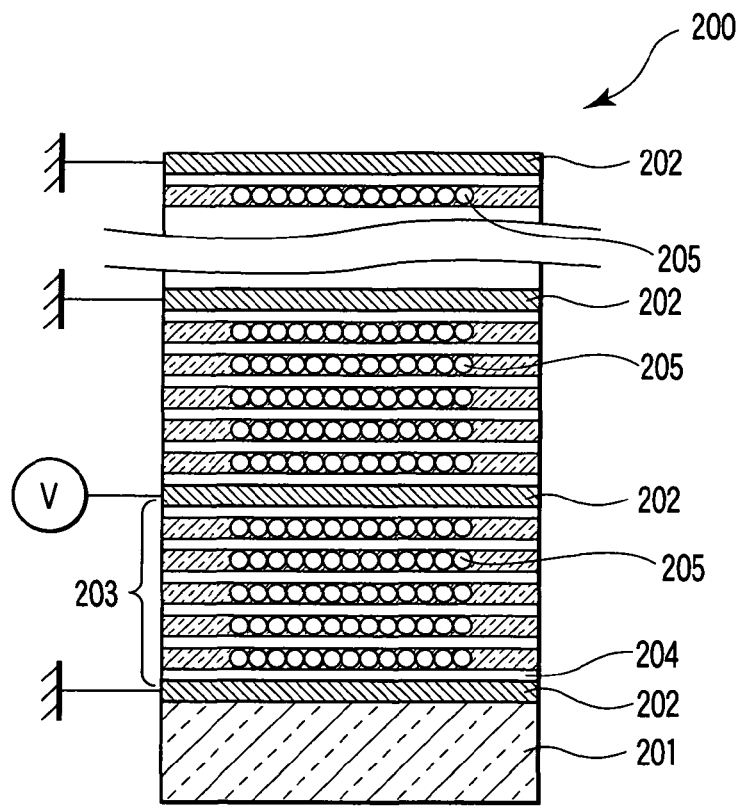
FIG. 12 is a cross-sectional view showing the refractive index variable element in Example 7.

A refractive index variable element 200 shown in FIG. 12 is prepared. As shown in FIG. 12, the refractive index variable element 200 included ITO electrodes 202 and structures 203 alternately stacked on a substrate 201. The structure 203 is a stack comprising five cycles of a tunneling barrier $SiO_2$ layer 204 (a relative dielectric constant of about 4) and a layer of $Si_{10}$ quantum dots 205 each having a size of about 0.7 nm and an additional tunneling barrier $SiO_2$ layer 204. The structure 203 has a thickness of about 10 nm. Also, a stack comprising ten cycles of the ITO electrode 202 and the structure 203 and an additional ITO layer 202 is formed. The total thickness of the refractive index variable element 200 is about 100 nm. One of the paired ITO electrodes 202 having the structure 203 sandwiched therebetween is connected to the ground and voltage is applied to the other ITO electrode 202.

The applied voltage is repeatedly changed between 0 and V, as in a manner of 0, V, 0, V, so as to lower the voltage V. Incidentally, the applied voltage can be changed in a manner of 0, V, 2V, 3V. In this case, however, a higher voltage is required. The voltage V applied to the refractive index variable element is slowly elevated to 120V.

Figure 13:
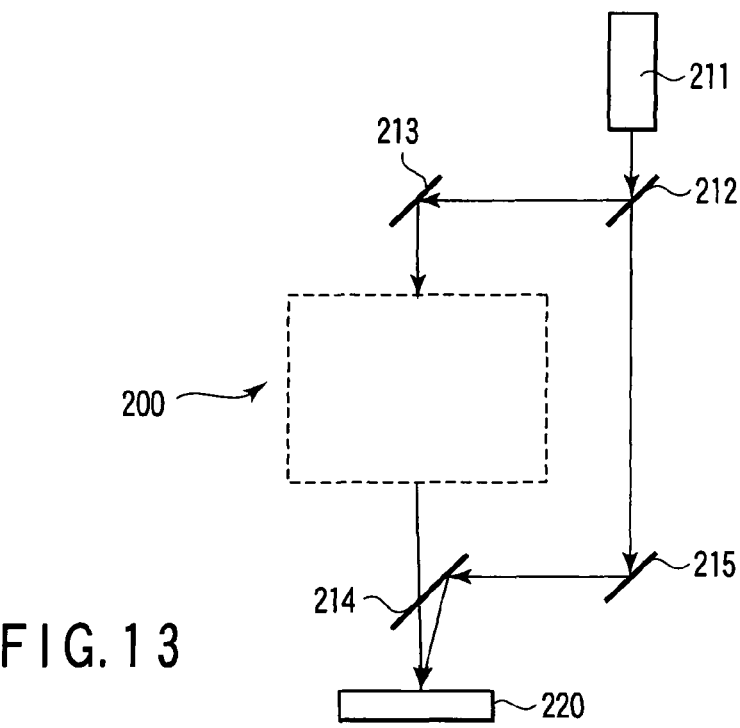
FIG. 13 is a schematic view showing a measuring system using the refractive index variable element in Example 7.

FIG. 13 is a schematic view showing a measuring system using the refractive index variable element shown in FIG. 12. The laser beam emitted from a laser 211 is reflected by a half mirror 212 and a mirror 213 so as to have the refractive index variable element 200 irradiated with the laser beam used as an operating light. The laser beam passing through the refractive index variable element 200 is projected onto a screen 220 via a half mirror 214. On the other hand, the laser beam emitted from the laser 211 and passing through the half mirror 212 is reflected by a mirror 215 and a half mirror 214 so as to be projected onto the screen 220 as a reference light. As a result, interference fringes formed by the operating light and the reference light appear on the screen 220.

When a laser beam with a wavelength of 413 nm is used and the voltage between the paired ITO electrodes 202 having the structure 203 interposed therebetween is gradually increased, it is confirmed that the interference fringes are moved on the screen 220. This implies that an electron is injected into the quantum dot by application of the voltage to the structure 203 so that the refractive index of the entire refractive index variable element 200 is varied.

Figure 14:
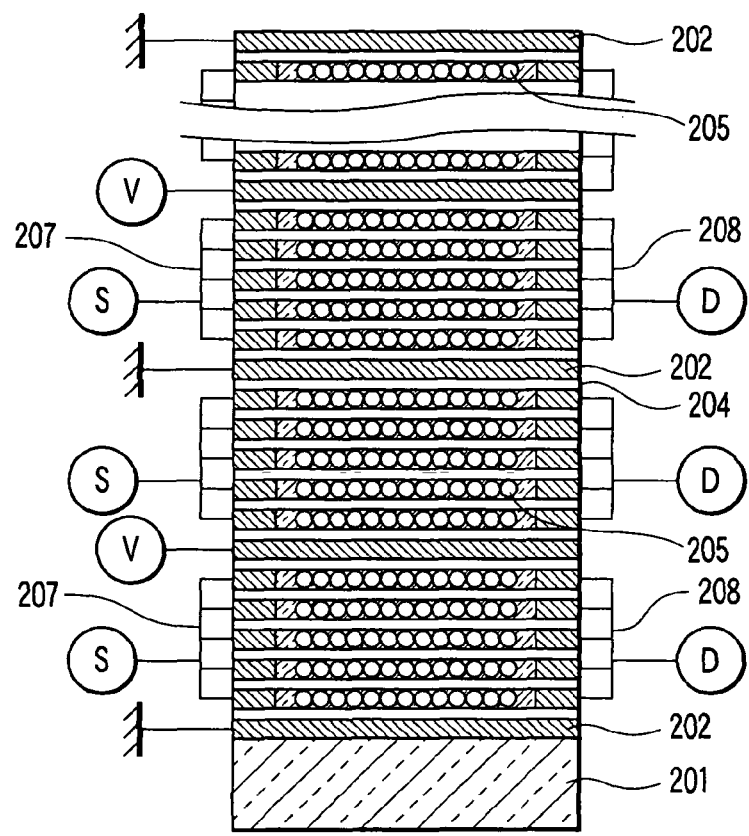
FIG. 14 is a cross-sectional view showing the refractive index variable element according to a modification in Example 7.

A refractive index variable element shown in FIG. 14 is prepared as a modification of that in FIG. 12. The refractive index variable element shown in FIG. 14 comprises a source electrode 207 formed on one edge and a drain electrode 208 formed on the other edge of each of the $Si_{10}$ quantum dot layers 205, in addition to the construction shown in FIG. 12. In this case, the ITO electrode 202 formed on the uppermost $SiO_2$ layer 204 of the structure 203, to which the voltage V is applied, performs the function of a gate electrode.

The sample of the refractive index variable element shown in FIG. 14 is irradiated with a part of the laser beam having a wavelength of 413 nm (an operating light) and the other part of the laser beam is used as a reference light in the measuring system of shown in FIG. 13 so as to observe the interference fringes on the screen 220. In this case, a voltage of 200 mV is applied between the source and drain electrodes, and a current value is measured to confirm the Coulomb blockade phenomenon. Under the condition, the voltage applied to the gate electrode is gradually increased. As a result, the interference fringes start to move simultaneously with occurrence of the Coulomb blockade phenomenon. From the observation, it has been confirmed that the refractive index is varying.

Example 8

A refractive index variable element as shown in FIG. 12 is prepared by using barium titanate with a relative dielectric constant of 3,000 as the dielectric matrix in place of $SiO_2$ used in Example 7, and interference fringes are observed by using the apparatus shown in FIG. 13. As a result, it is confirmed that the moving speed of the interference fringes is increased by about 30%, compared with Example 7.

Similarly, where a refractive index variable element is prepared using transparent cellulose nitrate plastic with a relative dielectric constant of about 7 as the dielectric matrix in place of $SiO_2$ used in Example 7, it is confirmed that the moving speed of the interference fringes is increased by about 12%, compared with Example 7.

The results imply that the increase in the relative dielectric constant of the dielectric matrix promotes the refractive-index variation caused by the voltage application to the refractive index variable element.

Example 9

Figure 15:
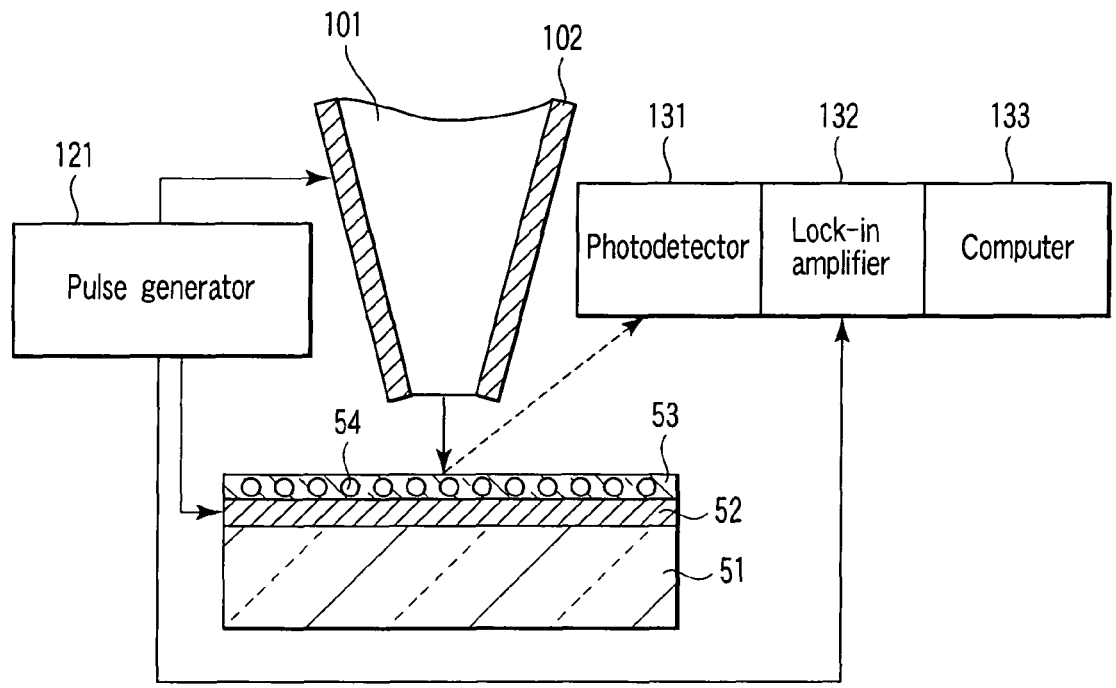
FIG. 15 is a cross-sectional view showing the refractive index variable element in Example 9.

The refractive index variation caused by electron injection into the quantum dot in the dielectric matrix is examined in respect of the refractive index variable element shown in FIG. 15.

On an ITO electrode 52 formed on a glass substrate 51, a structure in which quantum dots are dispersed in a dielectric matrix 53 is formed. As the material of the dielectric matrix, polymethylmethacrylate (PMMA), titania, $SiO_2$, or polystyrene is used. As the material of the quantum dot, an Au nanoparticle, a Si nanoparticle, a fullerene ($C_{60}$) molecule, a carbon nanotube, or a ferrocene molecule is used. Table 3 shows the combinations of the quantum dot material and the dielectric matrix material. The thickness of the structure is about 50 nm in each case. Also, the volume fraction of the quantum dots 54 in the structure is set to about 5% by volume.

For observation under an illumination mode, an NSOM probe 101 with a metal (Au) coat 102 applied thereto is arranged over the sample. A pulse generator 121 is connected between the metal coat 102 of the probe 101 and the ITO electrode 52 formed on the glass substrate 51. Under the condition, voltage is applied between the metal coat 102 and the ITO electrode 52 so as to permit an electron to be injected into the quantum dot 54 or to be discharged from the quantum dot 54 by the tunneling effect.

If the refractive index of the structure is varied, the reflected light from the structure is also varied. In the refractive index variable element shown in FIG. 15, the structure is irradiated with the near-field light emitted from the tip surface of the probe 101 so as to detect the reflected light from the structure. The reflected light from the structure is detected by a photodetector 131, amplified by a lock-in amplifier 132, and then analyzed by a computer 133.

When an AC voltage of 120 Hz is applied by the pulse generator 121, an electron tunnels the dielectric matrix 53 at an appropriate voltage so as to bring about electron injection into the quantum dot 54 or electron discharge from the quantum dot 54. As a result, it is possible to observe the refractive index variation and the reflectance variation in synchronized with the AC voltage.

For reference, the refractive index variation is examined by utilizing the quantum confined Stark effect in respect of a quantum well thin film of $Ga_{0.42}In_{0.58}As_{0.9}P_{0.1}/InP$. In the case of GaInAsP/InP, the refractive index variation is increased with increase in the applied electric field. The magnitude of the applied voltage is set to 36.5V, which is the voltage immediately before breakdown.

The wavelength used in the measurement is as follows. Each material has a small absorption coefficient at the wavelength given below, which means to be a transparent region.

| | |
|---|---|
| GaInAsP/InP | 1.53 μm, |
| Ferrocene | 800 nm, |
| other quantum dots | 650 nm. |

The amount of the reflected light is normalized by the amount of that for GaInAsP/InP. The results are shown in Table 3.

As shown in Table 3, it is possible to obtain a large refractive index variation in the case of injecting an electron into the quantum dot formed of any of the Au nanoparticle, the Si nanoparticle, the fullerene molecule, the carbon nanotube and the ferrocene molecule. In particular, the refractive index variation is increased when the dielectric matrix has a higher relative dielectric constant.

In the present Example, the volume fraction of the quantum dots in the structure is set to about 5%. If the volume fraction of the quantum dots is increased, however, the refractive index variation is also increased.

TABLE 3

| material of quantum dot (size) | material of matrix (relative dielectric constant) | volume fraction of quantum dot (%) | normalized amount of reflected light |
|---|---|---|---|
| GaInAsP/InP | — | 100% | 1 |
| Au (0.5 nm) | PMMA (4) | 5% | 1.1 |
| Au (0.5 nm) | titania (100) | 5% | 1.4 |
| Si (0.7 nm) | $SiO_2$ (4) | 5% | 2.1 |
| Si (0.7 nm) | titania (100) | 5% | 2.7 |
| $C_{60}$ (0.7 nm) | polystyrene (2.6) | 5% | 1.1 |
| $C_{60}$ (0.7 nm) | titania (100) | 5% | 1.5 |
| single wall carbon nanotube (1 nm) | polystyrene (2.6) | 5% | 1.08 |
| single wall carbon nanotube (1 nm) | titania (100) | 5% | 1.4 |
| ferrocene | PMMA (4) | 5% | 1.1 |
| ferrocene | titania (100) | 5% | 1.4 |

Example 10

Figure 16:
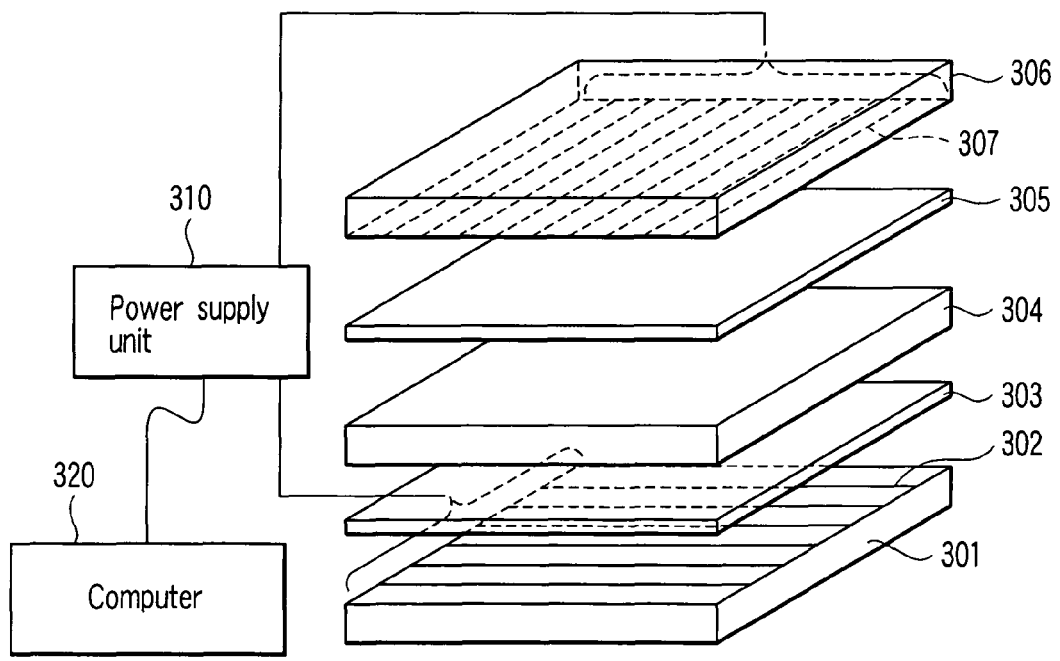
FIG. 16 is an exploded perspective view showing the refractive index variable element in Example 10.

FIG. 16 is an exploded perspective view showing the refractive index variable element to which passive matrix electrodes, used in a liquid crystal display panel and the like, are applied.

A glass substrate 301 having X-electrodes 302 formed thereon, a tunneling barrier layer 303, a structure 304, another tunneling barrier layer 305, and a glass substrate 306 having Y-electrodes 307 formed thereon are stacked. The structure 304 is prepared by dispersing quantum dots in a dielectric matrix. The X-electrodes 302 and the Y-electrodes 307 are connected to a power supply unit 310, and the power supply unit 310 is controlled by a computer 320.

An electron is injected into the quantum dot included in the structure 304 in only the cross points of the X-electrodes 302 and the Y-electrodes 307, where there is a potential difference, which brings about refractive index variation in those points. In such an apparatus, the refractive index in an arbitrary portion can be varied. Therefore, it is possible to fabricate a waveguide circuit of an arbitrary configuration.

Incidentally, the refractive index variable element of the present invention is not limited to the construction shown in FIG. 16 in which a passive matrix of the X-electrodes 302 and the Y-electrodes 307 is formed. Alternatively, a thin film transistor (TFT) may be formed in each portion, i.e., a cell, where the refractive index should be changed.

Next, the glass substrate 301 having the X-electrodes 302 and the glass substrate 306 having the Y-electrodes are made removable in the refractive index variable element shown in FIG. 16. The X-electrodes and the Y-electrodes are brought into contact with the structure and, after formation of the optical waveguide under the state that an electron is injected into the quantum dot, the X-electrodes and the Y-electrodes are removed, followed by verifying the function as an optical waveguide immediately. As a result, it has been confirmed that the structure provides a desired effect as an optical waveguide.

Example 11

In the present Example, a refractive index variable element including a multi-step junction is fabricated. The Coulomb blockade phenomenon is caused not only in the single-step junction but also in the multi-step junction. This has already been proven by a phenomenon called "Coulomb steps".

Figure 17:
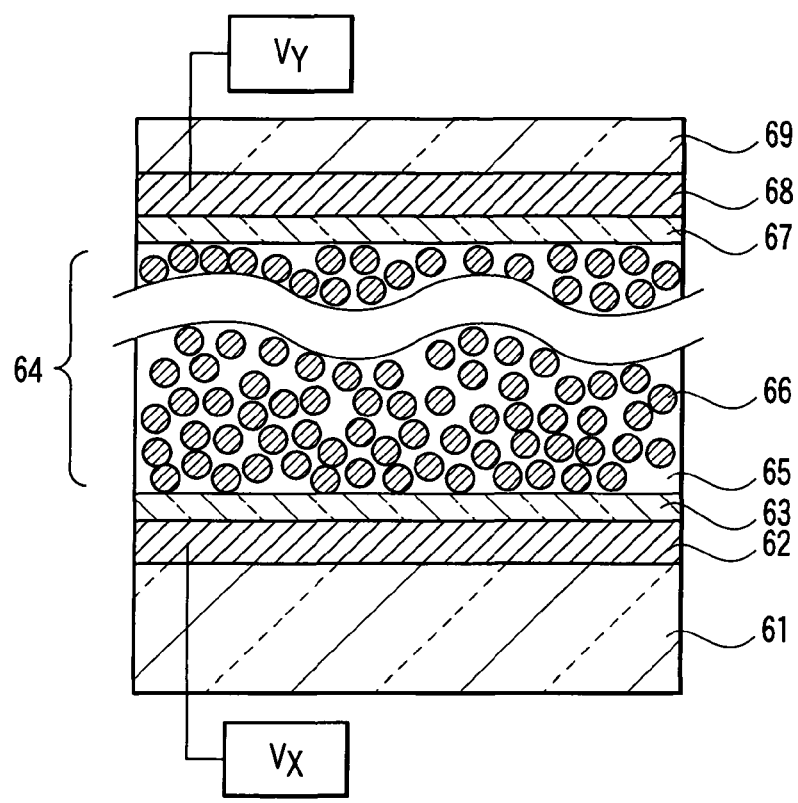
FIG. 17 is a cross-sectional view showing a single cell included in the refractive index variable element in Example 11.

FIG. 17 is a cross-sectional view showing a single cell included in the refractive index variable element in the present Example. The cell has a construction in which, on a $SiO_2$ substrate 61 on which an ITO electrode (X-electrode) 61 is formed, a $SiO_2$ tunneling barrier layer 63 with a thickness of about 3 nm, a structure 64 prepared by dispersing $Si_{10}$ quantum dots 66 with a size of about 1 nm in a $SiO_2$ matrix 65, another $SiO_2$ tunneling barrier layer 67 having a thickness of about 3 nm, and an ITO electrode (Y-electrode) 68 and a cover $SiO_2$ layer 69 are stacked. In the structure 64, a large number of $Si_{10}$ quantum dots 66 are arranged at random in the $SiO_2$ matrix 65 not only in the in-plane direction but also in the thickness direction. The $SiO_2$ matrix 65 thin enough to permit electron tunneling is present in the spacing between the $Si_{10}$ quantum dots 66.

The planar size of a single cell is about 40 nm square. Such cells are formed on the substrate 61 sized at 100 nm square to form a tetragonal lattice. As in FIG. 16, the ITO electrodes (X-electrodes) 62 and the other ITO electrodes (Y-electrodes) 63 are arranged to form a passive matrix.

When an electron is injected into the quantum dot 66 in a cell at a prescribed position, a positive voltage is applied to a selected X-electrode 62 and a negative voltage is applied to a selected Y-electrode 68 at a prescribed timing. In this stage, the electrodes for the cell into which an electron is not injected are connected to the ground. Since there is a threshold value in the voltage required for the electron injection into the quantum dot 66, the electron injection does not take place unless the voltage difference between the X- and Y-electrodes exceeds the threshold value.

If a high-frequency voltage of 0 to ±100V is applied between the electrodes for a selected cell so as to inject an electron into the quantum dot 66, it is possible to vary the refractive index of the selected cell. The reason why a high-frequency voltage is applied is to inject an electron into a desired cell without specifying the voltage. Since each cell has a memory function, the electron is retained once the electron is injected into the cell.

Figure 18:
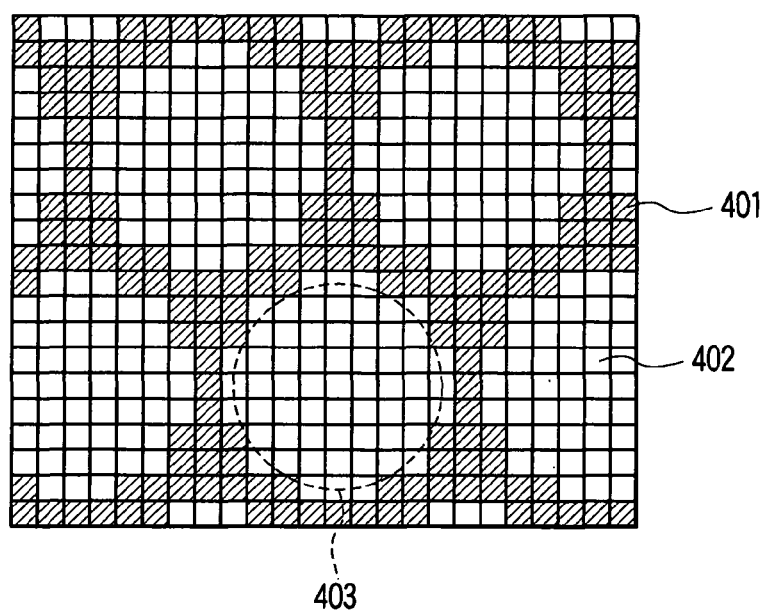
FIG. 18 is a plan view showing a photonic crystal formed by using the refractive index variable element in Example 11.

First, as shown in the plan view given in FIG. 18, a photonic crystal is formed by periodically arranging regions with a low refractive index in regions with a high refractive index with a period in an order approximated to the wavelength of incident light. In FIG. 18, high refractive index cells 401 are formed by injecting an electron into the cells in a prescribed position, and groups of low refractive index cells 402 are closely packed (Triangular lattice) in the high refractive index cell 401 in a manner to form lattice points 403 of a photonic crystal, the lattice points 403 being formed into a pseudo circular column with a size of about 200 nm. The photonic crystal has a photonic band gap through which the light with a wavelength of 800 nm is incapable of passing. Incidentally, the arrangement of the lattice points 403 is not limited to the two-dimensional close packing as shown in FIG. 18. Alternatively, it is also possible for the lattice points 403 to be arranged in another alignment such as a tetragonal lattice.

Figure 19:
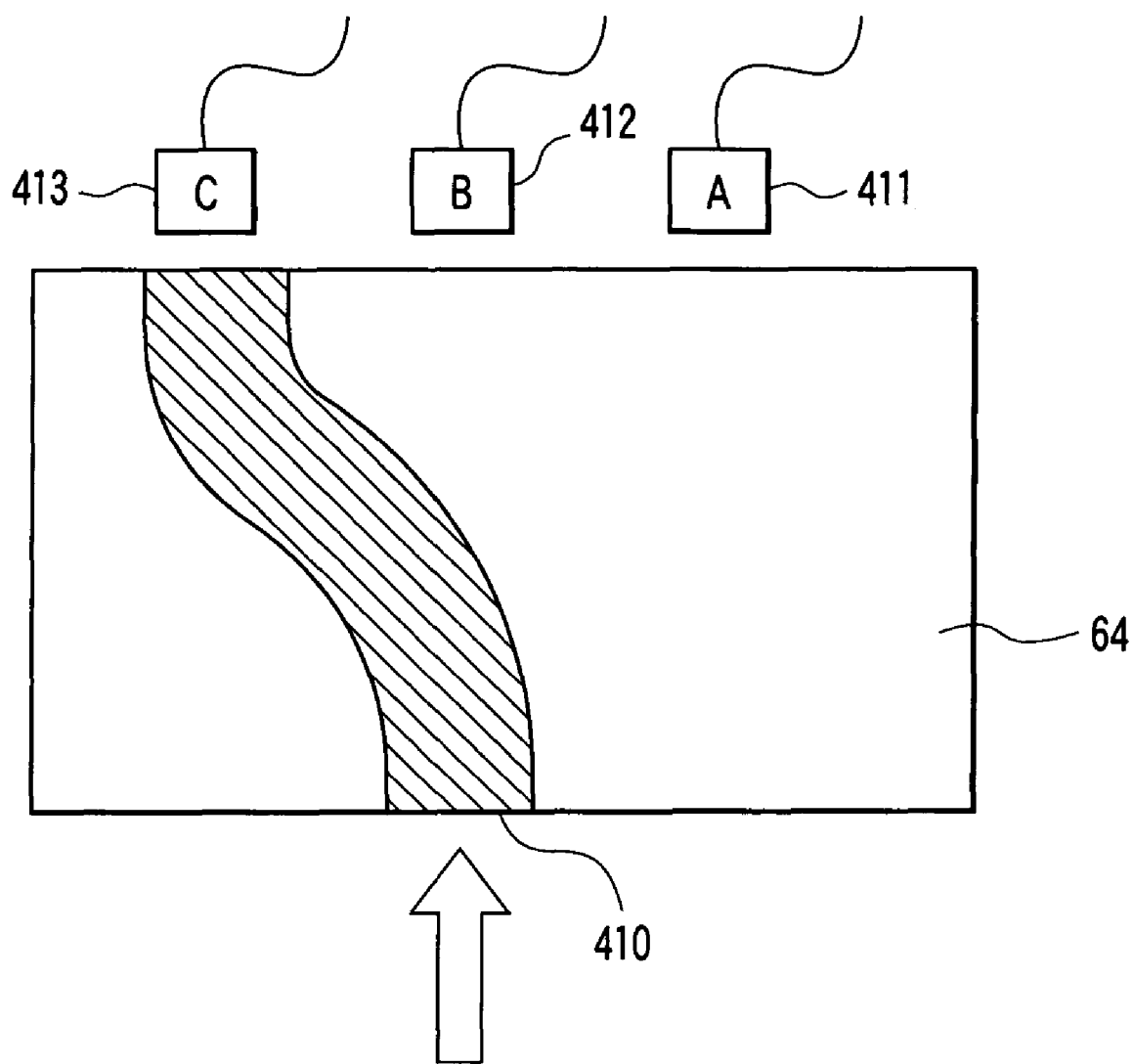
FIG. 19 is a plan view showing the waveguide formed by using the refractive index variable element in Example 11.

Next, as shown in the plan view given in FIG. 19, a curved waveguide 410 is formed in the structure 64. In this case, an electron is injected into all the cells within the region corresponding to the waveguide 410 to form high refractive index cells. In FIG. 19, the light is incident through the inlet port of the waveguide 410 positioned on one side of the structure are arranged along the opposite side of the structure 64. The photodetector (B) 412 is positioned on an extension of the optical axis of the light incident on the waveguide 410. The photodetector (C) 413 is positioned in the vicinity of the outlet port of the waveguide 410. The photodetector (A) 411 is positioned away from the photodetector (B) 412 and the photodetector (C) 413.

Where a laser beam is incident from a position corresponding to the inlet port of the waveguide shown in FIG. 19 without injecting an electron into any cells of the structure 64, the light in an amount of 95% of the incident light is detected by the photodetector (B) 412. The loss of the light amount is caused by scattering.

High refractive index cells are formed by injecting electrons into prescribed cells in a manner to form the lattice points of the regularly arranged photonic crystal as shown in FIG. 18 in the region other than the waveguide 410 shown in FIG. 19. Under the condition, a laser beam with a wavelength of 800 nm is allowed to be incident on the waveguide 410. As a result, the laser beam is not detected by the photodetector (B) 412 but is detected by the photodetector (C) 413.

On the other hand, where an electron is not injected into the cells in the portion other than the waveguide 410 shown in FIG. 19, i.e., where the lattice points of the photonic crystal are not formed, the light in an amount exceeding 80% of the incident light is detected by the photodetector (C) 413. In this fashion, an ordinary waveguide can be formed without forming a waveguide in the photonic crystal. It follows that the refractive index variable element in the present Example makes it possible to change the refractive index distribution in a programmable fashion.

Example 12

The refractive index variable element shown in FIG. 12 is modified such that the pair of electrodes having the structure 203 sandwiched therebetween are replaced with the X-electrodes and the Y-electrodes similar to those shown in FIG. 16, and the number of total stacking is increased so as to increase the entire thickness to 10 mm. In this refractive index variable element, the thickness of the silicon quantum dots is about 30% of the entire thickness of the element. Silicon has a refractive index of about 3.5, and the maximum refractive index variation of the silicon quantum dot is 12%. Therefore, the value obtained by multiplying the maximum difference in the refractive index by the thickness is 3.5×0.12×10×0.3=1.26.

On the other hand, in a glass planoconvex lens with a diameter of 50 mm, the value obtained by multiplying the difference in refractive index (1.5) between the central portion and the peripheral portion corresponding to a focal distance of 800 mm by the thickness is: 1.5×0.8=1.2, which is substantially equal to the above value of 1.26.

A refractive index variable element of the construction shown in FIG. 12 and having a size of 50 mm is fabricated. The refractive indexes on the element is varied concentrically such that the central portion thereof has the maximum refractive index and the peripheral portion thereof has the minimum refractive index by controlling the applied voltage, thereby setting the refractive index distribution into a circular arc configuration. It has been confirmed that the refractive index variable element produces the effect substantially equal to that produced by the glass planoconvex lens having a focal distance of 800 mm.

Also, it is possible to allow the refractive index variable element of the present invention to have the characteristics of a concave lens or an aspheric lens, or to change the focal distance by changing the setting such as the applied voltage. For example, it has been confirmed that the focal distance can be controlled by changing the refractive index variation per unit length within a plane parallel to the substrate. It is possible to achieve a lens having a short focal distance, which cannot be manufactured by the glass lens, provided that the beam size is small.

A sub-wavelength structure having irregularity of the size smaller than the half wavelength is formed on the surface of the refractive index variable element for preventing the reflection, with the result that the reflectance is decreased from 10% to 3%. The reflection can be prevented completely, if a multi-layered film is formed on the surface of the refractive index variable element.

The present invention is not limited to the embodiments described above. For example, it is possible for those skilled in the art to modify the refractive index variable element of the present invention by selecting appropriately the specific construction, the shape, the material, the size, the number, or the arrangement of the refractive index variable element used in the present invention based on the description given above so as to work the present invention similarly and, thus, to obtain the similar effect. Needless to say, the modification noted above is included in the technical scope of the present invention.

Further, the refractive index variable element and the method of varying the refractive index that can be achieved by those skilled in the art by modifying the design appropriately based on the refractive index variable element and the method of varying the refractive index according to the embodiments of the present invention described above fall within the technical scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A refractive index variable element, comprising:
   a structure including quantum dots having discrete energy levels and a dielectric matrix surrounding the quantum dots; and
   an electron discharger discharging an electron from the quantum dots through the dielectric matrix to convert the quantum dots into cations.

2. The refractive index variable element according to claim 1, further comprising a light source which irradiates the structure with light.

3. The refractive index variable element according to claim 1, wherein
   the electron discharger is formed of a pair of electrodes having the structure sandwiched therebetween, and
   at least one of the paired electrodes is arranged corresponding to a part of the structure.

4. The refractive index variable element according to claim 1, wherein
   the electron discharger is formed of a pair of electrodes having the structure sandwiched therebetween, and
   at least one of the paired electrodes is transparent.

5. The refractive index variable element according to claim 1, wherein the dielectric matrix has a relative dielectric constant of 7 or more.

6. The refractive index variable element according to claim 1, wherein the quantum dots include at least one material selected from the group consisting of a metal fine particle, a semiconductor fine particle, a fullerene molecule, a carbon nanotube and an organic molecule.

7. The refractive index variable element according to claim 1, wherein the quantum dots converted into cations by discharge of an electron are present nonuniformly so as to make refractive index distribution of the structure nonuniform.

8. A refractive index variable element, comprising:
   a structure including quantum dots having discrete energy levels and a dielectric matrix surrounding the quantum dots, the dielectric matrix being selected from the group consisting of $SiO_2$, titania, barium titanate, polymethylmethacrylate, and polystyrene; and
   an electron discharger discharging an electron from the quantum dots through the dielectric matrix to convert the quantum dots into cations.

9. An optical waveguide element, comprising:
   a structure including quantum dots having discrete energy levels and a dielectric matrix surrounding the quantum dots;
   an election discharger formed of a pair of electrodes having the structure sandwiched therebetween, at least one of the paired electrodes being arranged corresponding to a part of the structure and at least one of the paired electrodes being transparent, the electron discharger discharging an electron from the quantum dots through the dielectric matrix to convert the quantum dots into cations; and
   a light source which irradiates the structure with light in a transparent region.

* * * * *